US012779675B2

(12) United States Patent
Bennice et al.

(10) Patent No.: US 12,779,675 B2
(45) Date of Patent: Nov. 3, 2026

(54) TRAINING ROBOT CONTROL POLICIES

(71) Applicant: GDM Holding LLC, Mountain View, CA (US)

(72) Inventors: Matthew Bennice, San Jose, CA (US); Paul Bechard, Ogdensburg, NY (US); Joséphine Simon, San Francisco, CA (US); Jiayi Lin, Sunnyvale, CA (US)

(73) Assignee: GDM HOLDING LLC, Mountain View, CA (US)

( * ) Notice: Subject to any disclaimer, the term of this patent is extended or adjusted under 35 U.S.C. 154(b) by 722 days.

(21) Appl. No.: 17/890,783

(22) Filed: Aug. 18, 2022

(65) Prior Publication Data

US 2024/0058954 A1 Feb. 22, 2024

(51) Int. Cl.
*B25J 9/16* (2006.01)
*B25J 19/02* (2006.01)

(52) U.S. Cl.
CPC ............... *B25J 9/163* (2013.01); *B25J 9/161* (2013.01); *B25J 9/1671* (2013.01); *B25J 19/022* (2013.01)

(58) Field of Classification Search
CPC . B25J 9/163; B25J 9/161; B25J 9/1671; B25J 19/022; G05B 2219/32014; G05B 2219/40499
USPC ........... 700/250; 701/245; 703/7; 318/568.11
See application file for complete search history.

(56) References Cited

U.S. PATENT DOCUMENTS 6,167,607 B1 * 1/2001 Pryor .................... B25J 19/021 29/702
10,131,053 B1 * 11/2018 Sampedro ............. B25J 9/1666
10,766,136 B1 * 9/2020 Porter .................... G06N 3/045
10,766,137 B1 * 9/2020 Porter ...................... G06N 3/04
2019/0176333 A1 * 6/2019 Hager, IV ............. B25J 9/1676
2019/0321974 A1 * 10/2019 Leon ...................... B25J 9/1687
2021/0122035 A1 * 4/2021 Furlan ...................... G06N 3/04
2022/0024037 A1 1/2022 Lee (Continued)

FOREIGN PATENT DOCUMENTS

JP 2000010466 A * 1/2000
WO WO-2018063100 A2 * 4/2018 .......... B25J 11/0055

OTHER PUBLICATIONS

European Patent Office; International Search Report and Written Opinion issued in Application No. PCT/2023/030377; 10 pages; dated Jan. 2, 2024.

(Continued)

*Primary Examiner* — Ellis B. Ramirez
(74) *Attorney, Agent, or Firm* — Gray Ice Higdon

(57) ABSTRACT

Implementations are provided for training robot control policies using augmented reality (AR) sensor data comprising physical sensor data injected with virtual objects. In various implementations, physical pose(s) of physical sensor (s) of a physical robot operating in a physical environment may be determined. Virtual pose(s) of virtual object(s) in the physical environment may also be determined. Based on the physical poses virtual poses, the virtual object(s) may be injected into sensor data generated by the one or more physical sensors to generate AR sensor data. The physical robot may be operated in the physical environment based on the AR sensor data and a robot control policy. The robot control policy may be trained based on virtual interactions between the physical robot and the one or more virtual objects.

19 Claims, 5 Drawing Sheets

(56) References Cited

U.S. PATENT DOCUMENTS

2024/0190004 A1* 6/2024 Bai ........................ G05B 17/02

OTHER PUBLICATIONS

Kim et al., "Silhouettes from Real Objects Enable Realistic Interactions with a Virtual Human in Mobile Augmented Reality" Applied Sciences. 2021, 11, 2763. https://doi.org/10.3390/app11062763, 18 pages, dated Mar. 19, 2021.

Makhataeva et al., "Augmented Reality for Robotics: A Review" Robotics 2020, 9, 21;doi:10.3390/robotics9020021, 28 pages, dated Apr. 2, 2020.

Reiners et al., "The Combination of Artificial Intelligence and Extended Reality: A Systematic Review" Front. Virtual Real. 2:721933. doi: 10.3389/frvir.2021.721933, 13 pages, dated Sep. 7, 2021.

Bassyouni et al., "Augmented Reality Meets Artificial Intelligence in Robotics: A Systematic Review" Front. Robot. AI 8:724798. doi:10.3389/frobt.2021.724798, 20 pages, dated Sep. 22, 2021.

* cited by examiner

400

TRAINING ROBOT CONTROL POLICIES

BACKGROUND

Robot control policies are trained to enable robots to navigate through environments autonomously, including interacting with (e.g., touching, engaging with, operating, dodging, etc.) objects perceived in those environments. These robot control policies often take the form of machine learning models, such as reinforcement learning policies. Training robot control policies can be costly and time consuming. While the robot control policies can be bootstrapped using imitation learning (IL), it is still necessary to further train the robot control policies via myriad training episodes of robot activity.

Conducting training episodes of robot activity using physical robots in real-world physical environments may be prohibitively expensive and/or dangerous, as robot collisions can potentially cause harm to people, property, or even the robots themselves. These risks can be mitigated by conducting training episodes in controlled and/or lower entropy (e.g., less dynamic) physical environments, such as airport terminals during off-peak hours or offices outside of business hours. The downside, however, is these controlled and/or lower entropy physical environments do not realistically represent the real-world, resulting in an inadequately trained robot control policy. By contrast, wholly simulated robot episodes can be implemented with significantly less resources and at much larger scale. However, simulated robot episodes also fail to realistically represent the real world in which robots will ultimately operate.

SUMMARY

Implementations are described herein for training robot control policies using augmented reality (AR) sensor data comprising physical sensor data injected with virtual objects. More particularly, but not exclusively, implementations are described herein for operating a physical robot in a physical environment based on a robot control policy to be trained and AR sensor data. Based on virtual interactions between the physical robot and the one or more virtual objects injected into the physical sensor data—e.g., including rewards and/or penalties calculated from those virtual interactions—the robot control policy may be trained.

Techniques described herein give rise to various technical advantages and benefits. Unlike when simulating a virtual robot to interact with the virtual objects in an entirely simulated environment, operating a physical robot to interact with virtual objects injected into physical sensor data allows for robot control policy training to account for real-world (and often unpredictable) physical phenomena that are experienced by the physical robot. Additionally, the physical robot can be operated safely in a controlled or low-entropy physical environment, while seeming to operate in a far more dynamic environment that can be augmented with any number of virtual objects. This enables generation of myriad training episodes with relatively little cost, resulting in robot control policies being better trained for real-world operation. For example, traffic patterns of busy environments such as airports, restaurants, festivals, etc. can be imitated using virtual objects injected into physical sensor data, allowing for a robot control policy to better "learn" how to deal with these environments.

In various implementations, one or more physical poses of one or more physical sensors of a physical robot operating in a physical environment may be determined. These physical poses may include locations and/or orientations of the sensor(s), such as a sensor's roll, pitch, yaw, height or other spatial dimension. One or more virtual poses of one or more virtual objects in the physical environment may also be determined, e.g., randomly, based on previously observed movement patterns, etc.

Based on the one or more physical poses and the one or more virtual poses, the one or more virtual objects may be injected into sensor data generated by the one or more physical sensors to generate AR sensor data. In some implementations, this injection may include projecting the one or more virtual objects onto sensor data generated by one or more of the physical sensors of the physical robot. For example, pixel values of vision data generated by a physical vision sensor of the physical robot—that is, pixel values that represent physical object(s) in physical space—may be replaced with virtual pixel values representing one or more virtual objects. As another example, ranges generated by a light detection and ranging (LIDAR) sensor of the physical robot may be replaced with virtual ranges calculated between the LIDAR sensor and the one or more virtual objects.

In some implementations in which a physical robot utilizes a publication-subscription ("PubSub") communication framework, one or more messages published by one or more of the physical sensors may be intercepted prior to the one or more messages reaching one or more subscribers of the physical robot. One or more of the virtual objects may then be injected into the one or more published messages, after which the injected published messages may be provided to the appropriate downstream logic (e.g., perception, planning).

Once the AR sensor data is prepared, the physical robot may be operated in the physical environment based on the AR sensor data and a robot control policy. For example, after frames of vision data are injected with virtual object(s), the physical robot may process each injected vision data frame, e.g., as at least part of an overall state, using a reinforcement learning (RL) robot control policy. The output generated based on the RL robot control policy may include a probability distribution over actions that are performable by the physical robot in that moment. The physical robot may then select one or more next actions based on that probability distribution.

Virtual interactions between the physical robot and the one or more virtual objects may then be observed. Virtual interactions may include any action performed by the physical robot in response to a detected (e.g., injected) virtual object. For example, in some implementations, one or more of the virtual objects may take the form of an animated organism, such as a person or animal. One possible virtual interaction with an animated organism may be the physical robot crossing a virtual barrier (e.g., "perimeter") defined around the animated organism. For example, in some implementations, the virtual barrier around an organism may take the form of a virtual cylinder with dimensions selected so that the robot control policy is trained to keep physical robots at least some minimum distance (e.g., a half meter, six inches, etc.) away from organisms. Thus, the physical robot crossing such a virtual barrier may be treated as a negative reward or penalty that is used to train the robot control policy. Likewise, if the physical robot manages to avoid crossing such barriers, e.g., when confronted with a large number of moving virtual organisms, positive reward(s) may be generated and used to train the robot control policy.

In some implementations, virtual objects may be generated by simulating, in an otherwise empty simulated space, one or more virtual objects, such as people, animals, other robots, or other dynamic and/or static objects. In addition, one or more physical poses of one or more physical sensors of a physical robot may be used to simulate one or more floating virtual sensors in the simulated space that correspond to the one or more physical sensors of the physical robot. In various implementations, the one or more virtual poses of the one or more virtual objects may be determined from virtual sensor data generated by the one or more floating virtual sensors from detecting the one or more virtual objects moving in the simulated space.

When multiple animated virtual objects (e.g., people) are simulated at once, it is possible, even likely, that some virtual objects will pass between the virtual sensor(s) and other virtual objects. If those were real physical objects, they would naturally occlude each other from the perspective of the robot's physical sensors. To generate realistic training episodes, it may be beneficial to simulate virtual objects so that they occasionally occlude each other from the perspective of the virtual sensor(s) corresponding to the robot(s) physical sensor(s). Accordingly, in various implementations, depth data that is "captured" (e.g., calculated based on a distance between virtual object(s) and the virtual sensor(s)) by a virtual sensor may be used to mask virtual objects to portray realistic occlusion when one virtual object stands between a virtual sensor and another virtual object. For instance, pixels of a farther away first virtual object may be replaced with (e.g., masked with) pixels from a closer second virtual object that stands between the first virtual object and the applicable vision sensor(s).

In some implementations, a computer implemented method may be provided that includes: determining one or more physical poses of one or more physical sensors of a physical robot operating in a physical environment; determining one or more virtual poses of one or more virtual objects in the physical environment; based on the one or more physical poses and the one or more virtual poses, injecting the one or more virtual objects into sensor data generated by the one or more physical sensors to generate augmented reality (AR) sensor data; operating the physical robot in the physical environment based on the AR sensor data and a robot control policy; and training the robot control policy based on virtual interactions between the physical robot and the one or more virtual objects.

In various implementations, the injecting may include projecting the one or more virtual objects onto sensor data generated by one or more of the physical sensors of the physical robot. In various implementations, the injecting may include replacing detected pixel values of vision data generated by a physical vision sensor of the physical robot with virtual pixel values representing the one or more virtual objects. In various implementations, the injecting may include replacing ranges generated by a light detection and ranging (LIDAR) sensor of the physical robot with virtual ranges calculated between the LIDAR sensor and the one or more virtual objects. In various implementations, the injecting may include: intercepting one or more messages published by one or more of the physical sensors prior to the one or more messages reaching one or more subscribers of the physical robot; and injecting one or more of the virtual objects into the one or more published messages.

In various implementations, training the robot control policy may include performing reinforcement learning to train the robot control policy based on rewards or penalties determined from the virtual interactions between the physical robot and the one or more virtual objects. In various implementations, determining the one or more virtual poses of the one or more virtual objects in the physical environment may include generating one or more random poses for one or more of the virtual objects.

In various implementations, determining the one or more virtual poses of the one or more virtual objects in the physical environment may include selecting the one or more virtual poses from a plurality of reference physical poses of physical objects observed previously in the same physical environment or a different physical environment. In various implementations, determining the one or more virtual poses may include: simulating, in an otherwise empty simulated space: one or more floating virtual sensors that correspond to the one or more physical sensors of the physical robot, and the one or more virtual objects moving in the simulated space; and determining the one or more virtual poses from virtual sensor data generated by the one or more floating virtual sensors from detecting the one or more virtual objects moving in the simulated space.

In various implementations, the method may further include: detecting one or more lighting conditions in the physical environment; and causing the one or more virtual objects injected into the sensor data to include visual characteristics caused by the one or more detected lighting conditions.

In various implementations, the one or more virtual objects may include one or more animated organisms, and the one or more virtual interactions include the physical robot crossing a virtual barrier defined around one or more of the animated organisms. In various implementations, the virtual barrier may take the form of a cylinder.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
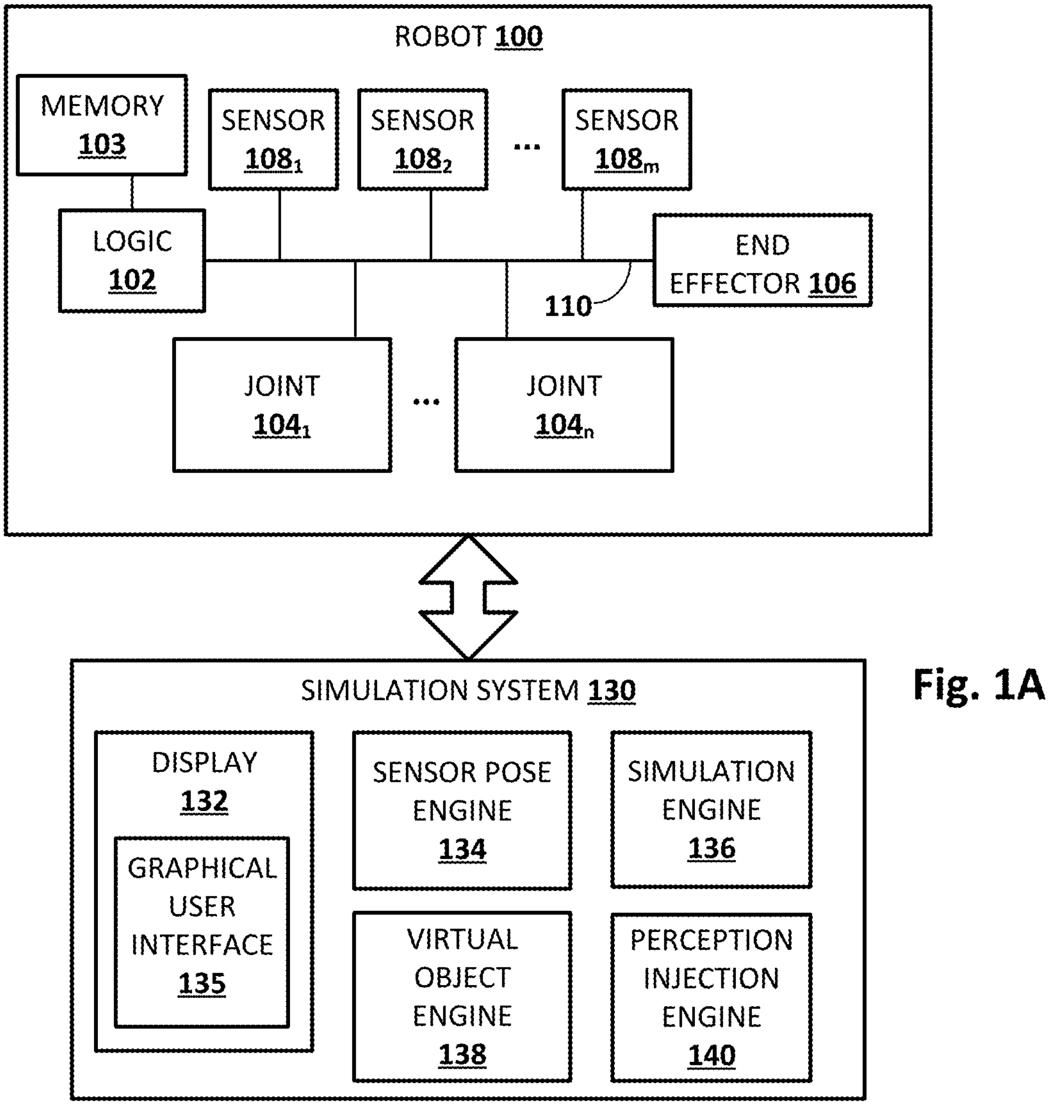
FIG. 1A schematically depicts an example environment in which disclosed techniques may be employed, in accordance with various implementations.

FIG. 1A is a schematic diagram of an example environment in which selected aspects of the present disclosure may be practiced in accordance with various implementations. The various components depicted in FIG. 1A, particularly those components forming a simulation system 130, may be implemented using any combination of hardware and software. Robot 100 may be in communication with simulation system 130, and/or all or parts of simulation system 130 may be implemented onboard robot 100.

Figure 1B:
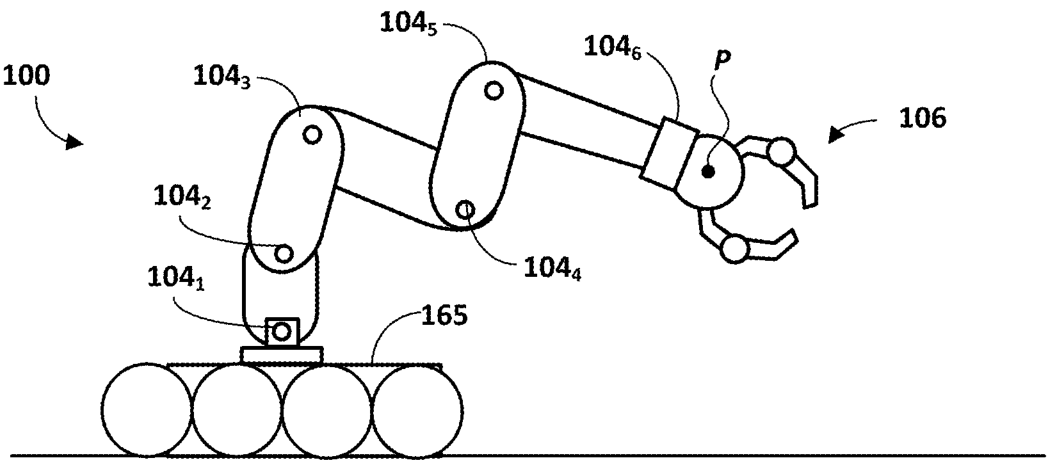
FIG. 1B depicts an example robot, in accordance with various implementations.

Robot 100 may take various forms, including but not limited to a telepresence robot (e.g., which may be as simple as a wheeled vehicle equipped with a display and a camera), a robot arm, a multi-pedal robot such as a "robot dog," an aquatic robot, a wheeled device, a submersible vehicle, an unmanned aerial vehicle ("UAV"), and so forth. One non-limiting example of a mobile robot arm is depicted in FIG. 1B. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random-access memory ("RAM"), dynamic RAM ("DRAM"), read-only memory ("ROM"), Magnetoresistive RAM ("MRAM"), resistive RAM ("RRAM"), NAND flash memory, and so forth. In some implementations, a robot controller may include, for instance, logic 102 and memory 103 of robot 100.

In some implementations, logic 102 may be operably coupled with one or more joints 1041, one or more end effectors 106, and/or one or more sensors $\mathbf{108}_{1\text{-}m}$, e.g., via one or more buses 110. As used herein, "joint" 104 of a robot may broadly refer to actuators, motors (e.g., servo motors), shafts, gear trains, pumps (e.g., air or liquid), pistons, drives, propellers, flaps, rotors, or other components that may create and/or undergo propulsion, rotation, and/or motion. Some joints 104 may be independently controllable, although this is not required. In some instances, the more joints robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances. Some robots, such as some telepresence robots, may not be equipped with end effectors. Instead, some telepresence robots may include displays to render visual representations of the users controlling the telepresence robots, as well as speakers and/or microphones that facilitate the telepresence robot "acting" like the user.

Sensors 108 may take various forms, including but not limited to 3D laser scanners (e.g., light detection and ranging, or "LIDAR") or other 3D vision sensors (e.g., stereographic cameras used to perform stereo visual odometry) configured to provide depth measurements, two-dimensional cameras (e.g., RGB, infrared), light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, Geiger counters, and so forth. While sensors $\mathbf{108}_{1\text{-}m}$ are depicted as being integral with robot 100, this is not meant to be limiting.

In some implementations. simulation system 130 may include one or more computing devices cooperating to perform selected aspects of the present disclosure. An example of such a computing device is depicted schematically in FIG. 5. In some implementations, simulation system 130 may include one or more servers forming part of what is often referred to as a "cloud" infrastructure, or simply "the cloud." Alternatively, one or more components of simulation system 130 may be operated by logic 102 of robot 100.

Various modules or engines may be implemented as part of simulation system 130 as software, hardware, or any combination of the two. For example, in FIG. 1A, simulation system 130 includes a display interface 132 that is controlled, e.g., by a user interface engine 134, to render a graphical user interface ("GUI") 135. A user may interact with GUI 135 to trigger and/or control aspects of simulation system 130, e.g., to control a simulation engine 136 that simulates a virtual environment or a virtual object engine 138 that adds virtual objects to that simulated environment.

A sensor pose engine 134 may be configured to determine, based on various control and/or localization data provided by (or intercepted from) robot 100, one or more physical poses of one or more physical sensors 108 of robot 100, in Euclidean and/or joint space. For example, sensor pose engine 134 may be configured to determine a location and/or orientation (e.g., yaw, pitch, roll) of a camera or LIDAR sensor onboard robot 100 within a physical environment in which robot 100 operates.

Simulation engine 136 may be configured to simulate a virtual environment in which virtual object(s) generated by virtual object engine 138 may be simulated and observed by one or more virtual sensors that correspond to one or more physical sensors 108 of robot 100. For example, simulation engine 136 may be configured to simulate a 3D environment that includes one or more virtual objects. Note that the virtual environment need not be rendered visually on a display. In many cases, the virtual environment (also referred to herein as a "simulated environment") may be simulated without any visual representation being provided on a display as output. Based on physical sensor pose(s) determined by sensor pose engine 134, simulation engine 136 may simulate corresponding virtual sensor(s) in the simulated environment. In some implementations, to keep computation costs low and/or to minimize latency, simulation engine 136 may simulate virtual object(s) and virtual sensor(s) in an otherwise empty simulated space. For example, instead of being simulated as part of an entire simulated robot, a simulated vision sensor may be rendered as a standalone floating sensor in the simulated space that, besides any virtual object(s), is otherwise empty. In some implementations, basic environmental parameters, such as a virtual floor or virtual walls, may be omitted from simulation to conserve additional computing resources.

Simulation engine 136 may be further configured to provide, e.g., to a perception injection engine 140 (described below), sensor data that is generated from a perspective of at least one of the virtual sensors that is simulated in the simulated space. As an example, suppose a virtual floating vision sensor is pointed in a direction of a particular virtual object in the virtual environment. Simulation engine 136 may generate and/or provide, to perception injection engine 140, simulated vision sensor data that depicts the particular virtual object as it would appear from the perspective of the simulated vision sensor in the virtual environment.

Virtual object engine 138 may be configured to generate virtual objects that are to be simulated by simulation engine 136 and, ultimately, injected into perception data by perception injection engine 140. In some implementations, virtual object engine 138 may also select locations and/or poses of these virtual objects in a virtual or physical space (e.g., a virtual space that simulates a real-world physical space in which robot 100 operates).

Virtual object engine 138 may generate various types of virtual objects in various ways. In some implementations, virtual object engine 138 may generate virtual organisms, such as people or pets. Additionally or alternatively, virtual object engine 138 may generate other dynamic objects such as virtual robots, machinery, or liquid (e.g., a spilled drink), or static objects such as furniture, equipment, etc. Virtual objects may or may not be animated, although the more realistic the virtual object, the more useful it may be for training a robot control policy.

In some implementations, virtual object engine 138 may also simulate or define a virtual barrier or boundary around a virtual object. For a virtual object in the form of a person, for instance, the virtual barrier may take the form of a bounding shape, such as one or more cylinders, having a diameter or width sufficient to capture the entire virtual human with space to spare. In some implementations, the virtual barrier may define a buffer zone around the virtual object. If, while operating in a physical environment, robot 100 enters or crosses over into this buffer zone, that may be considered a virtual interaction with the virtual object, e.g., a collision or near-collision. In various implementations, such a virtual interaction may be used as feedback to train a robot control policy, e.g., as a penalty for reinforcement learning.

In some implementations, virtual object engine 138 may generate virtual objects and/or select their poses in the physical environment non-deterministically (e.g., randomly, stochastically). For example, a random number of simulated people (which may be homogeneous or heterogeneous in appearance) may be simulated, each virtual person being animated to transition through a plurality of randomly selected poses. In other implementations, virtual object engine 138 may determine virtual pose(s) of virtual object(s) in the physical environment by selecting virtual poses from a plurality of reference physical poses of physical objects observed previously in the same physical environment or a different physical environment. For example, if training a robot to operate in a busy airport terminal, virtual object engine 138 may generate virtual people based on observed patterns of real people in real airport terminals.

Perception injection engine 140 may be configured to "inject" virtual object(s) generated by virtual object engine 138 and/or simulated by simulation engine 136 into perception data, such as sensor data generated by one or more sensors 108 of robot 100. With a digital camera, for instance, perception injection engine 140 may project views of virtual object(s) captured by a virtual digital camera on top of real digital images captured by the physical digital camera, e.g., as overlay(s). In some implementations, pixels of such digital images may be replaced with pixels that collectively depict virtual object(s). In the case of a LIDAR sensor, perception injection engine 140 may replace ranges generated by the LIDAR sensor of robot 100 with virtual ranges calculated between the LIDAR sensor and one or more virtual objects. In the case of a stereoscopic vision sensor (e.g., two lenses that cooperate to capture depth data), the same virtual object may be projected onto the digital image created at each lens, e.g., with each virtual object being rendered from the perspective of the respective lens.

In various implementations, perception injection engine 140 may intercept "ground truth" sensor data actually captured by the physical sensor, inject virtual object(s) into that sensor data as described herein to generate what is referred to herein as "AR sensor data," and then provide that AR sensor data downstream, e.g., to a planning module of a robot controller. In some implementations in which robot 100 employs a publish/subscribe (or "PubSub") framework, sensor data published by one or more sensors may be obtained by perception injection engine 140 (e.g., operating as a subscriber), injected to generate AR sensor data, and then perception injection engine 140 may publish the AR sensor data to downstream subscriber(s).

FIG. 1B depicts a non-limiting example of a robot 100 in the form of a robot arm. An end effector 106 in the form of a gripper claw is removably attached to a sixth joint 1046 of robot 100. In this example, six joints 1041_6 are indicated. However, this is not meant to be limiting, and robots may have any number of joints. In some implementations, robot 100 may be mobile, e.g., by virtue of a wheeled base 165 or other locomotive mechanism. Robot 100 is depicted in FIG. 1B in a particular selected configuration or "pose."

Figure 2:
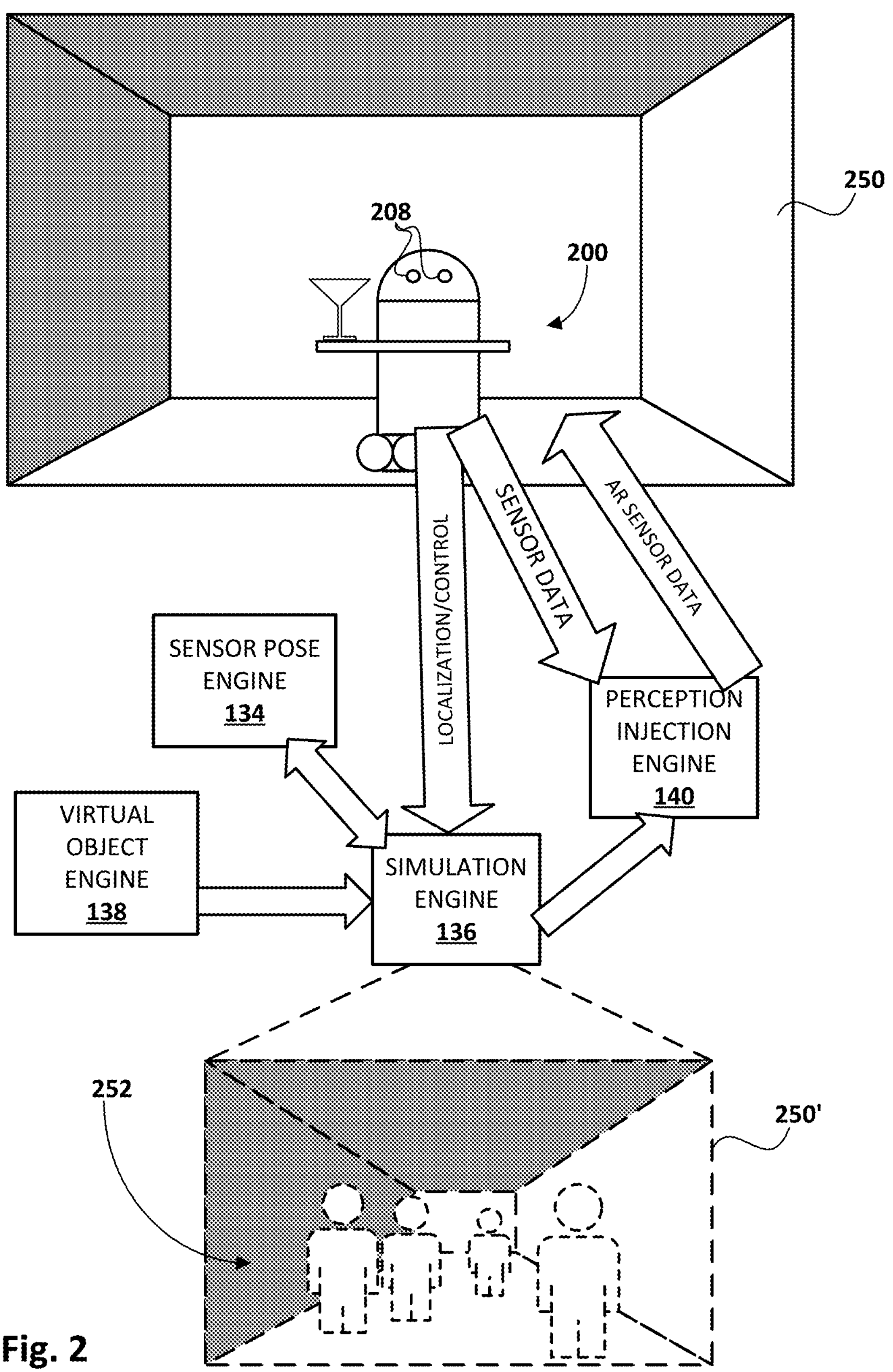
FIG. 2 schematically depicts an example of how a robot's perception of a physical environment in which the robot operates may be augmented as described herein to facilitate training episode generation.

FIG. 2 schematically depicts an example of how a robot's perception of a physical environment in which the robot operates may be augmented as described herein to facilitate training episode generation. A robot 200 is depicted in the form of a mobile robot that carries a tray on which items such as beverages may be placed. Robot 200 may thus be configured to act as a "robotic waiter" or "server" that traverses through room 250, distributing drinks and/or other items. Robot 200 includes vision sensors 208 in the form of two lenses of a stereoscopic camera, but this is not meant to be limiting. Robot 200 may include other types of sensors mentioned above, such as LIDAR sensors, 2D digital cameras, etc.

As shown at top, the physical environment in which robot 200 operates, room 250, appears to be empty, aside from robot 200. With techniques described herein, it is possible to train a robot control policy used by robot 200 by operating robot 200 physically within empty room 250 to generate numerous training episodes. Each training episode may feature physical robot 200 having virtual interactions with one or more virtual objects that are injected into perception data used by robot 200. Thus, it is possible to safely operate robot 200 to generate training episodes and minimize the risks posed to robot 200 and/or to others.

In addition, techniques described herein maximize the "true physical phenomena" experienced by robot 200 in room 250. For example, the floor of room 250 may have various textures (e.g., carpet, spilled liquid, grass or dirt if outdoors) that influence robot locomotion. The air may include particulates that affect sensor(s) of robot 200 over time, e.g., creating Gaussian blur. While many of these phenomena can be simulated to generate training episodes, there remains a gap between the quality of simulated phenomena and true physical phenomena. Robot control policies trained using training episodes that feature the latter may be better tuned for real-world operation.

As shown by the arrows, localization and/or control data (e.g., joint commands) generated by robot 200 may be provided to/intercepted by simulation engine 136. In some implementations, simulation engine 136 may then provide this data to sensor pose engine 134. In other implementations, localization and/or control data may be provided to/intercepted by sensor pose engine 134 directly. In either case, sensor pose engine 134 may determine physical pose(s) of physical sensor(s) of robot 200 and provide these to simulation engine 136. In some implementations, simulation engine 136 itself may perform the operations attributed herein to sensor pose engine 134. Simulation engine 136 may use the physical sensor poses determined by sensor pose engine 134 to simulate, in a simulated environment, virtual sensors having virtual poses that correspond to (e.g., match) the physical pose(s) provided by sensor pose engine 138. As noted above, in some implementations, this simulated environment may be relatively barren, e.g., populated solely by virtual objects and floating virtual sensor(s) that correspond to physical sensor(s) (e.g., 208) of robot 200.

Meanwhile, virtual object engine 138 may generate virtual object(s) as described above (randomly and/or based on previously observed movement patterns) and provide these to simulation engine 136. In some implementations, virtual object engine 138 may provide data indicative of the virtual object(s) and poses of the virtual object(s) to simulation engine 136. Simulation engine 136 may use this information to incorporate the virtual objects into the simulated environment, such that those virtual objects are detectable by the virtual sensors in the simulated environment.

Continuing with the arrows depicted in FIG. 2, sensor data generated by one or more sensors of robot 200 (e.g., 208) may be obtained (e.g., intercepted) by perception injection engine 140. Meanwhile, simulation engine 136 may provide perception injection engine 140 with data indicative of the simulation, such as views of the virtual object(s) generated by (e.g., from the perspective(s) of) the virtual sensors in the simulated environment. Perception injection engine 140 may then inject these views of the virtual objects into the intercepted sensor data to generate AR sensor data.

As shown by the right-most arrow in FIG. 2, this AR sensor data may be returned to a controller of robot 200. Consequently, instead of robot 200 observing room 250 in its true physical state, which is empty in FIG. 2, robot 200 perceives an AR version of room 250', shown at the bottom of FIG. 2. In AR version of room 250', room 250 has been augmented with four virtual objects 252 (depicted in dashed lines) in the form of four people. From the perspective of robot 200, these virtual objects 252, which may be animated, may appear like people socializing.

As robot 200 moves through physical room 250, the perceived state of room 250, which includes virtual objects 252, may be generated iteratively/repeatedly, e.g., at each cycle of the robot controller. This state may change due to robot 200 moving around room 200 relative to virtual objects 252, as well as virtual objects 252 themselves altering their poses (e.g., walking around). And at each iteration, the state may be processed by robot 200 using a robot control policy (e.g., a machine learning model such as a neural network) to generate probability distribution over an action space of robot 200. Robot 200 may then select its next action based on that probability distribution. These actions and their outcomes may form robot training episodes that are usable to train the robot control policy. For instance, should robot 200 come within a predetermined proximity of any of the virtual objects 252 (e.g., crossing into the virtual barrier defined around the virtual object), that virtual interaction may be used as a penalty for training the robot control policy using reinforcement learning.

Figure 3:
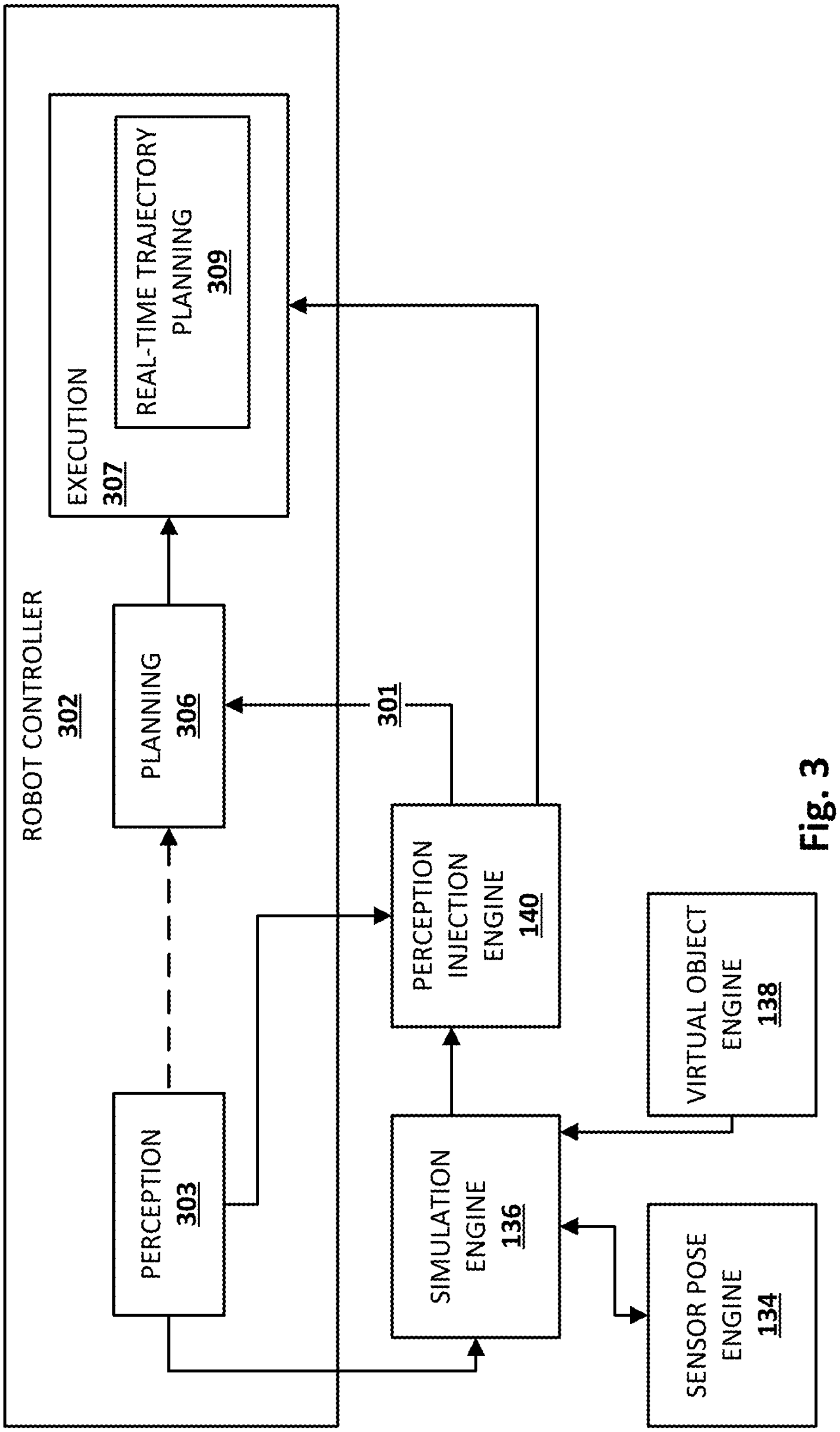
FIG. 3 schematically depicts an example of how techniques described herein may be implemented in relation to a robot controller, in accordance with various implementations.

FIG. 3 schematically depicts an example of how a robot controller 302 may interact with the various engines 134-140 to implement selected aspects of the present disclosure. Robot controller 302 may be implemented with various hardware and software, and may include components such as logic 102, memory 103, and in some cases, bus(ses) from FIG. 1A. From a logical standpoint, robot controller 302 may include a perception module 303, a planning module 306, and an execution module 307. Modules 303, 306, and/or 307 may operate in whole or in part using one or more machine learning models such as object recognition modules, robot control policies to aid in path planning and/or grasp planning, etc. One or more of these machine learning models may be trained using AR sensor data as described herein.

Perception module 303 may receive sensor data from any number of robot sensors (108 in FIG. 1A). When generating training episodes using a physical robot in a physical environment as described herein, this sensor data may come from physical sensors of the robot in which robot controller 302 is integral. In various implementations, this sensor data may include, for instance, vision data (digital camera data, infrared data, LIDAR data, etc.), anemometer data (data about wind speed), a torque sensor data captured at, for example, one or more robot joints, temperature data, humidity data, radiation data, and so forth.

The sensor data generated by these sensors may represent and/or be influenced by real-life environmental conditions in the physical environment in which the physical robot is operated to generate training episodes. For instance, aside from being observed by a sensor, an environmental condition may affect a sensor's operation. As one example, particulate debris collected on a lens or vision sensor over time may result in Gaussian blur. As another example, suppose the robot is a UAV that is configured to, for instance, pickup and/or deliver packages. In some such implementations, crosswinds may be experienced by the UAV when, for instance, the UAV is at a certain altitude, in a particular area, etc. By operating a physical UAV in a physical environment to generate training episodes, it is possible to account for real-world physical phenomena such as Gaussian blur, crosswinds, or other real-world environmental conditions such as temperature, non-uniform terrain, precipitation, ambient light, etc.

Perception module 303 may be configured to gather sensor data from the various sensors of the robot during each iteration of robot controller 302 (which may occur, for instance, at a robot controller's operational frequency). As indicated by the dashed arrow, perception module 303 would normally then generate or "publish" its state to at least planning module 306. This "state" may include or otherwise convey physical sensor data in raw form or in a preprocessed form, such as a reduced dimensionality embedding (which may or may not be a continuous vector embedding).

However, with techniques described herein, the data generated by perception module 303 may first be intercepted by perception injection engine 140. As shown in FIG. 3 and described previously, virtual object(s) and their pose(s) may be generated and provided by virtual object engine 138 to simulation engine 136. Simulation engine 136 may simulate these virtual objects in a simulated space (in many cases nearly empty), along with virtual sensor(s) corresponding to one or more physical sensors of the robot. As noted previously, poses of the physical sensors may be determined by sensor pose engine 134 and used as virtual poses of the virtual sensors in the simulated space.

Based on views of the virtual object(s) detected by the virtual sensor(s) in simulation, perception injection engine 140 may then inject virtual object(s) into the sensor data provided by perception module 303 (i.e. sensor data generated by the one or more physical sensors) to generate AR sensor data 301. Perception injection engine 140 may then provide this AR sensor data downstream, e.g., by publishing a current state (that includes or conveys the AR sensor data 301) to a subscriber such as planning module 306. Based on this current state, planning module 306 and/or execution module 307 may make various determinations and generate joint commands to cause joint(s) of the physical robot to be actuated.

Planning module 306 may perform what is sometimes referred to as "offline" planning to define, at a high level, a series of waypoints along a path for one or more reference points of a robot to meet. Execution module 307 may take into account sensor data received during each iteration to generate joint commands that will cause robot joints to be actuated to meet these waypoints (as closely as possible). For example, execution module 307 may include a real-time trajectory planning module 309 that considers the most recent sensor data to generate joint commands. These joint commands may be propagated to various robot joints to cause various types of joint actuation.

Figure 4:
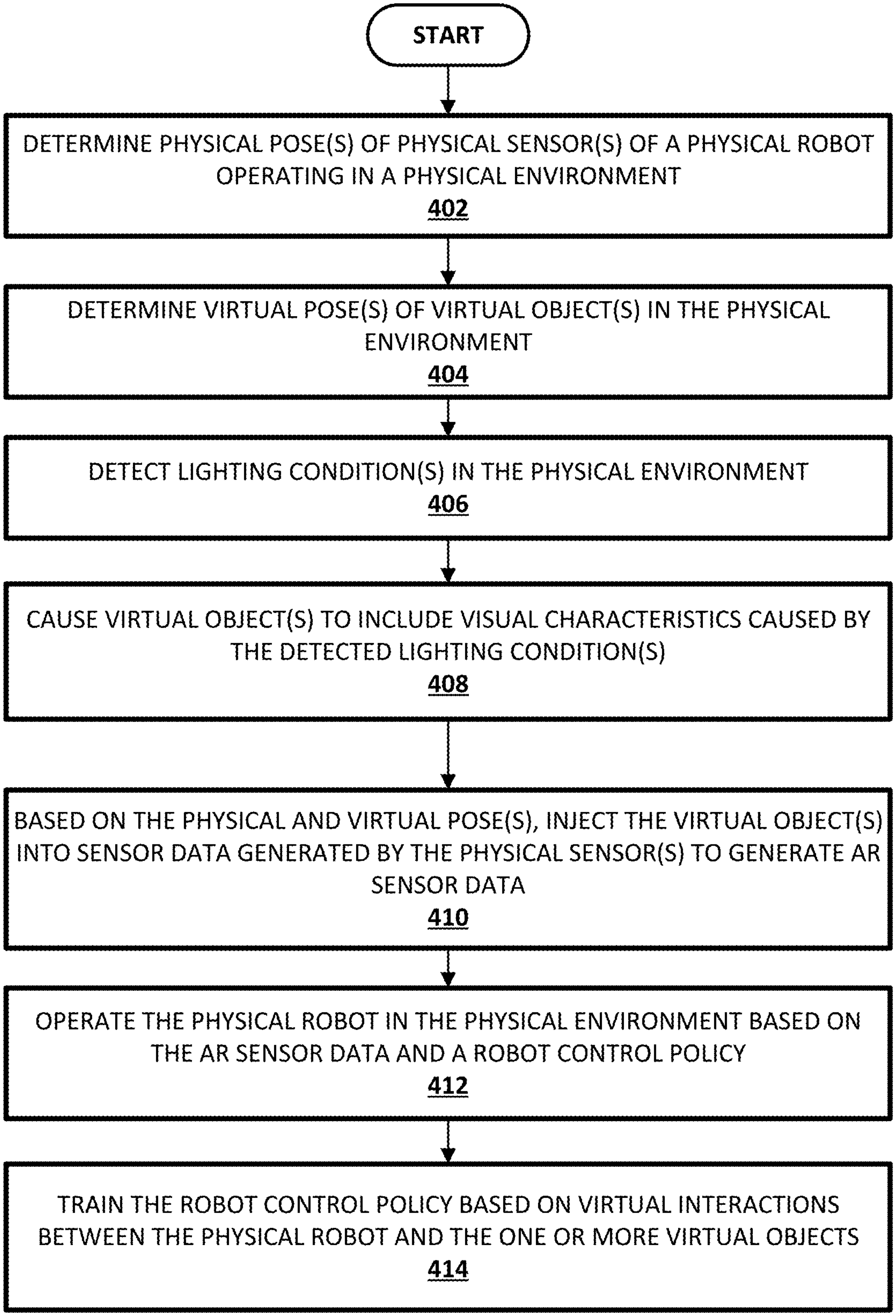
FIG. 4 depicts an example method for practicing selected aspects of the present disclosure.

Referring now to FIG. 4, an example method 400 of practicing selected aspects of the present disclosure is described. For convenience, the operations of the flowchart are described with reference to a system that performs the operations. This system may include various components of various computer systems. For instance, some operations may be performed at robot 100, while other operations may be performed by one or more components of simulation system 130. Moreover, while operations of method 400 are shown in a particular order, this is not meant to be limiting. One or more operations may be reordered, omitted or added.

At block 402, the system, e.g., by way of sensor pose engine 134, may determine one or more physical poses of one or more physical sensors of a physical robot operating in a physical environment. For example, sensor pose engine 134 may determine the physical pose(s) based on control data (e.g., joint commands) and/or localization data. Localization data may include, for instance, global positioning system (GPS) data, inertial measurement units, wireless triangulation data, or any other position data that is usable to localize the physical robot.

At block 404, the system, e.g., by way of simulation engine 136 and/or virtual object engine 138, may determine one or more virtual poses of one or more virtual objects in the physical environment. For example, virtual object engine 138 may randomly generate virtual object(s) with randomly selected poses. As another example, virtual object engine 138 may generate virtual object(s) based on previously observed virtual objects. For example, virtual object engine 138 may generate virtual people based on movement patterns of real people observed in an applicable environment (e.g., airport, restaurant, dance club, etc.). In some implementations, virtual object engine 138 may non-deterministically select virtual object(s) and/or their poses stochastically based on previously observed movement patterns.

In various implementations, determining the virtual pose(s) may include simulating, in an otherwise empty simulated space: one or more floating virtual sensors that correspond to the one or more physical sensors of the physical robot, and the one or more virtual objects moving in the simulated space. In various implementations, the one or more virtual poses may be determined from virtual sensor data generated by the one or more floating virtual sensors from detecting the one or more virtual objects moving in the simulated space.

In some implementations, virtual object engine 138 may account for real environmental conditions in the physical environment in which the robot operates when generating virtual objects. For instance, at block 406, the system, e.g., by way of one or more sensors onboard the physical robot or other sensors, may detect one or more lighting conditions in the physical space. At block 408, virtual object engine 138 or simulation engine 136 may cause the virtual object(s) to include visual characteristics (e.g., shimmer, shine, shadows, etc.) caused by the one or more lighting conditions detected at block 406. Techniques described herein are not limited to lighting conditions. Other real-life environmental conditions, such as moisture (e.g., from rain), particulates, etc., may be detected and used to adjust visual or other characteristics of virtual objects as well.

Based on the one or more physical poses and the one or more virtual poses, at block 410, the system, e.g., by way of perception injection engine 140, may inject the one or more virtual objects into sensor data generated by the one or more physical sensors to generate AR sensor data. At block 412, the physical robot may be operated (e.g., autonomously, semi-autonomously) in the physical environment based on the AR sensor data and a robot control policy (e.g., a machine learning model trained using reinforcement learning).

At block 414, the system may train the robot control policy based on virtual interactions between the physical robot and the one or more virtual objects. These virtual interactions may include, for instance, collisions with virtual objects or the robot crossing virtual barriers around the virtual objects. In various implementations, the training of block 414 may include performing reinforcement learning to train the robot control policy based on rewards or penalties determined from the virtual interactions between the physical robot and the one or more virtual objects.

Figure 5:
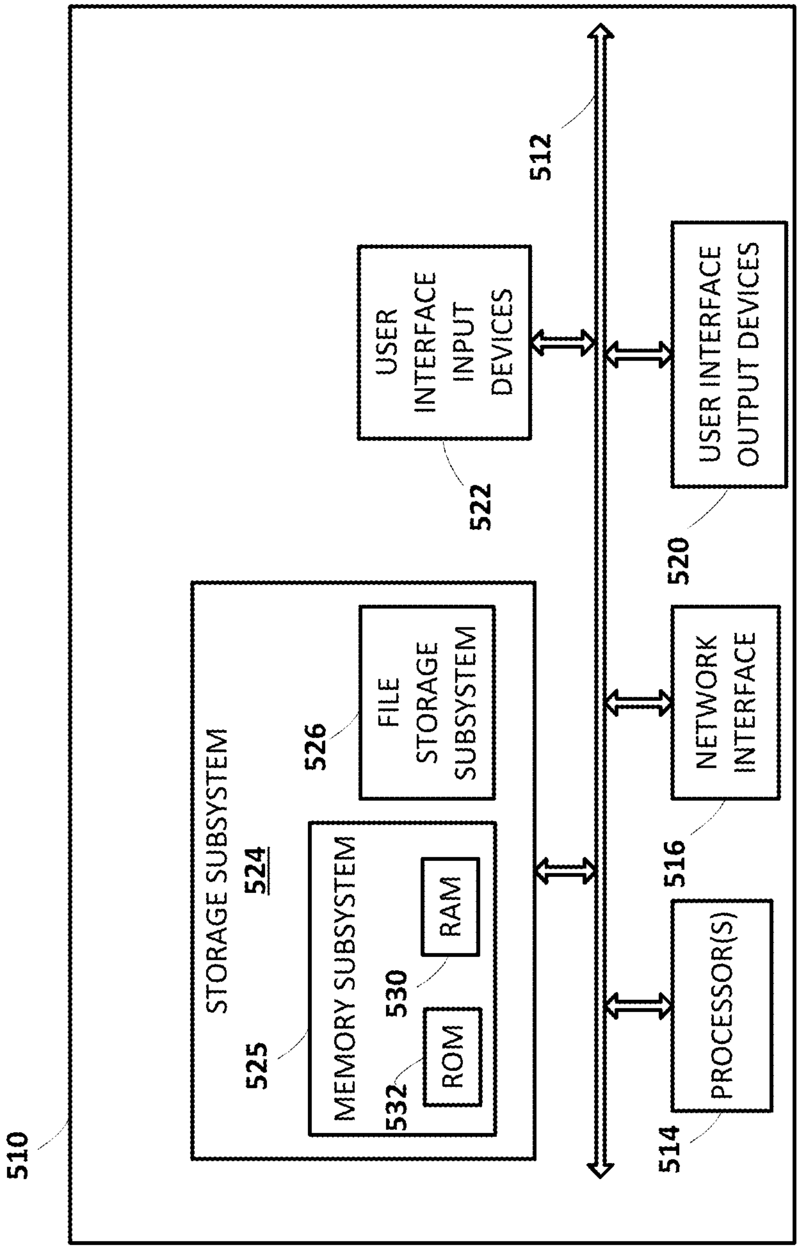
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more aspects of robot 100 or simulation system 130. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple buses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:

determining one or more physical poses of one or more physical sensors onboard a physical robot operating in a physical environment;

determining movement patterns of real objects observed in one or more environments;

determining, based on the movement patterns, a plurality of one or more virtual poses over time of a plurality of virtual objects that are not physically present in the physical environment;

based on the one or more physical poses and the plurality of virtual poses, injecting the plurality of virtual objects into sensor data, generated by the one or more physical sensors and capturing the physical environment, to generate augmented reality (AR) sensor data that depicts the physical environment augmented with the plurality of virtual objects animated to transition between the plurality of virtual poses;

while the virtual objects are depicted in the AR sensor data, operating the physical robot in the physical environment based on the virtual objects depicted in the AR sensor data and a robot control policy; and training the robot control policy based on virtual interactions between the physical robot and the plurality of virtual objects.

2. The method of claim 1, wherein the injecting comprises projecting the plurality of virtual objects onto sensor data generated by one or more of the physical sensors of the physical robot.

3. The method of claim 1, wherein the injecting comprises replacing detected pixel values of vision data generated by a physical vision sensor of the physical robot with virtual pixel values representing one or more of the virtual objects.

4. The method of claim 1, wherein the injecting comprises replacing ranges generated by a light detection and ranging (LIDAR) sensor of the physical robot with virtual ranges calculated between the LIDAR sensor and one or more of the virtual objects.

5. The method of claim 1, wherein the injecting comprises:

intercepting one or more messages published by one or more of the physical sensors prior to the one or more messages reaching one or more subscribers of the physical robot; and injecting one or more of the virtual objects into the one or more published messages.

6. The method of claim 1, wherein training the robot control policy comprises performing reinforcement learning to train the robot control policy based on rewards or penalties determined from the virtual interactions between the physical robot and one or more of the virtual objects.

7. The method of claim 1, wherein determining the plurality of virtual poses of the plurality of virtual objects in the physical environment comprises generating one or more random poses for one or more of the virtual objects.

8. The method of claim 1, wherein determining the plurality of virtual poses comprises:

simulating, in an otherwise empty simulated space:

one or more floating virtual sensors that correspond to the one or more physical sensors of the physical robot, and the plurality of virtual objects moving in the simulated space; and determining one or more of the virtual poses from virtual sensor data generated by the one or more floating virtual sensors detecting one or more of the virtual objects moving in the simulated space.

9. The method of claim 1, further comprising:

detecting one or more lighting conditions in the physical environment; and causing one or more of the virtual objects injected into the sensor data to include visual characteristics caused by the one or more detected lighting conditions.

10. The method of claim 1, wherein one or more of the virtual objects includes one or more animated organisms, and one or more of the virtual interactions include the physical robot crossing a virtual barrier defined around one or more of the animated organisms.

11. The method of claim 10, wherein the virtual barrier comprises a cylinder.

12. A system comprising one or more processors and memory storing instructions that, in response to execution by the one or more processors, cause the one or more processors to:

determine one or more physical poses of one or more physical sensors onboard a physical robot operating in a physical environment;

determine movement patterns of real objects observed in one or more environments;

determine, based on the movement patterns, a plurality of virtual poses over time of a plurality of virtual objects that are not physically present in the physical environment;

based on the one or more physical poses and the plurality of virtual poses, inject the plurality of virtual objects into sensor data generated by the one or more physical sensors and capturing the physical environment, to generate augmented reality (AR) sensor data that depicts the physical environment augmented with the plurality of virtual objects animated to transition between the plurality of virtual poses;

while the virtual objects are depicted in the AR sensor data, operate the physical robot in the physical environment based on the virtual objects depicted in the AR sensor data and a robot control policy; and train the robot control policy based on virtual interactions between the physical robot and the plurality of virtual objects.

13. The system of claim 12, wherein the injecting comprises projecting the plurality of virtual objects onto sensor data generated by one or more of the physical sensors of the physical robot.

14. The system of claim 12, wherein the injecting comprises replacing detected pixel values of vision data generated by a physical vision sensor of the physical robot with virtual pixel values representing one or more of the virtual objects.

15. The system of claim 12, wherein the injecting comprises replacing ranges generated by a light detection and ranging (LIDAR) sensor of the physical robot with virtual ranges calculated between the LIDAR sensor and one or more of the virtual objects.

16. The system of claim 12, wherein the injecting comprises:

intercepting one or more messages published by one or more of the physical sensors prior to the one or more messages reaching one or more subscribers of the physical robot; and injecting one or more of the virtual objects into the one or more published messages.

17. The system of claim 12, wherein training the robot control policy comprises performing reinforcement learning to train the robot control policy based on rewards or penalties determined from the virtual interactions between the physical robot and one or more of the virtual objects.

18. The system of claim 12, wherein determining the plurality of virtual poses of the plurality of virtual objects in the physical environment comprises generating one or more random poses for one or more of the virtual objects.

19. At least one non-transitory computer-readable medium comprising instructions that, when executed by one or more processors, cause the one or more processors to:

determine one or more physical poses of one or more physical sensors onboard a physical robot operating in a physical environment;

determine movement patterns of real objects observed in one or more environments;

determine, based on the movement patterns, a plurality of virtual poses over time of a plurality of virtual objects that are not physically present in the physical environment;

based on the one or more physical poses and the plurality of virtual poses, inject the plurality of virtual objects into sensor data generated by the one or more physical sensors and capturing the physical environment, to generate augmented reality (AR) sensor data that depicts the physical environment augmented with the plurality of virtual objects animated to transition between the plurality of virtual poses;

while the virtual objects are depicted in the AR sensor data, operate the physical robot in the physical environment based on the virtual objects depicted in the AR sensor data and a robot control policy; and train the robot control policy based on virtual interactions between the physical robot and the plurality of virtual objects.

* * * * *